United States Patent [19]

Lederman

[11] Patent Number: 4,711,330

[45] Date of Patent: Dec. 8, 1987

[54] ROLLER CLUTCH WITH IMPROVED SPRING GUIDANCE

[75] Inventor: Frederick E. Lederman, Sandusky, Ohio

[73] Assignee: General Motors Corporation, Detroit, Mich.

[21] Appl. No.: 903,786

[22] Filed: Sep. 5, 1986

[51] Int. Cl.$^4$ .................. F16D 15/00; F16D 41/07
[52] U.S. Cl. .................................. 192/45; 188/82.84
[58] Field of Search .................. 192/45, 44; 188/82.84

[56] References Cited

U.S. PATENT DOCUMENTS

| 3,087,588 | 4/1963 | Fischer | 192/45 |
| 3,917,036 | 11/1975 | Johnson | 192/45 |
| 4,054,192 | 10/1977 | Johnson | 192/45 |
| 4,368,809 | 1/1983 | Husmann | 192/45 |

FOREIGN PATENT DOCUMENTS 1213177  1/1963 Fed. Rep. of Germany .
1254916 11/1967 Fed. Rep. of Germany .

Primary Examiner—George H. Krizmanich
Attorney, Agent, or Firm—Patrick M. Griffin

[57] ABSTRACT

A roller clutch is improved to circumferentially guide its energizing springs to protect them from being radially dislocated and worn against the races. A circumferentially extending guide surface of the cage, located outside of the retention pocket, and a guide member on the spring, located remote from the active portion of the spring, slidably engage to guide the spring as it energizes the roller. By virtue of the location of the guide means, there is no effect or limitation on the motion of the roller or on the motion or size of the spring.

3 Claims, 7 Drawing Figures

ROLLER CLUTCH WITH IMPROVED SPRING GUIDANCE

This application relates to overrunning clutches in general, and specifically to a roller clutch having an improved means for guiding its energizing spring.

BACKGROUND OF THE INVENTION

Overrunning clutches, such as roller clutches, are used in several automotive applications to allow two rotatable members to rotate in a single selected relative direction. For example, roller clutches may be used instead of sprag clutches as shift timers to improve the smoothness of the vehicle's automatic transmission's shifting. The automatic transmission typically includes a multi-plate fluid operated friction clutch, not to be confused with the overrunning clutch. The friction clutch has a plurality of interleaved friction disks and steel plates. The steel plates are splined to an outer race of the roller clutch while an inner clutch race is journaled on the transmission shaft. The inner race confronts and forms an annular space with the outer race. A cage assembly, which retains a plurality of cylindrical rollers, is installed in the annular space between the races. This location of the roller clutch, radially between the friction clutch and the transmission shaft, saves axial space, but also presents a potential problem. A roller clutch, as opposed to a sprag clutch, has a plurality of circumferentially extending energizing springs, each of which bears on a roller to maintain it in the proper position to be quickly wedged between the races. The disks and plates of the friction clutch, when disengaged, must have a lubricant continually supplied between them to prevent excessive heat and wear. This lubricant is generally supplied from a port in the transmission shaft, and is directed centrifugally outwardly with a force that depends upon the rotational speed. Because the roller clutch cage is, in effect, in the way, that lubricant must go through it. Thus, the energizing springs are liable to be hit by this centrifugally directed lubricant, which may be quite forceful. Of course, the spring is itself subjected to centrifugal forces, as well as to various vibrations and shocks from the vehicle. All of these forces may act to radially dislocate the springs and wear them against the outer race as the roller clutch operates.

A roller clutch energizing spring acts on each roller to continually urge it toward, and maintain it in, what may be termed a ready position. The ready position is a position where the roller is engaged between a respective cam ramp of one race and a cylindrical pathway on the other race, ready to be wedged between the races quickly and automatically, with little or no lost motion, in response to a shift of relative rotation between the two races. In the type of overrunning clutch generally known as a concentricity control clutch, a plurality of evenly circumferentially spaced journal blocks located between the races have rubbing surfaces thereon that slide over the cylindrical pathway as the clutch overruns. The journal blocks have a radial thickness that substantially fills the annular space between the races, thereby maintaining the races in a substantially concentric or coaxial relationship. However, the radial thickness of the journal blocks is deliberately undersized in order that the journal blocks and clutch may be reasonably easily installed between the races. Thus, the races actually rotate relative to each other with a certain degree of running eccentricity, and the radial spacing between the cylindrical pathway and the cam ramps will actually change or oscillate with a very high frequency. That frequency matches or may even be a multiple of engine speed, in the automatic transmission application. The rollers contained between the cam ramps and pathway will consequently roll up and down the cam ramps with the same high frequency, which is referred to as the roller travel. The energizing springs that bear on the rollers must consequently circumferentially expand and contract with the same frequency and over the same path of travel in order to stay with the rollers and maintain them in the ready position. An energizing spring guide means should at least provide radial confinement to prevent the spring from being dislocated and thrown radially into the outer race, which could break the spring. Ideally, such a guide means would do more than that, and would also provide circumferential guidance to the spring as it expands and contracts, without interfering with its travel, and would also prevent it from wearing on the inner race.

Each energizing spring has what may be referred to as an active portion, defined as that portion of the spring that actually flexes as the spring expands and contracts. Thus, the front end of the spring, which directly bears on the roller but does not itself flex, as well as the opposed base of the spring, which is attached to or seats on a mounting portion of the cage, are not active portions of the spring. The most common type of roller clutch energizing spring is what may be referred to as an accordion spring, so named because it is formed of flat spring steel stock bent into a series of flat loops, each adjacent pair of which forms a V. Each loop forms one side of a V, extending between a pair of pleats. As the spring expands and contracts rapidly during operation of the clutch, it is the pleats that are the most highly stressed part of the active portion of the spring, because the majority of spring flexure occurs at and about the pleats. In the most common configuration of accordion energizing spring, the looos extend radially, and the pleats extend axially, within the annular space between the races. Since the loops extend radially, the front dead loop of the spring can be easily stamped with a curvature that conforms to the roller on which it bears. Because of that configuration, however, the highly stressed pleats directly radially confront the metal cam ramps and the cylindrical pathway. It will be well understood how, in an application where the spring is rapidly flexing and is also exposed to the kind of radial dislocating forces described, the crucial spring pleats are potentially highly subject to wear against the races. While the roller-conforming front dead loop of the spring provides some help in keeping the spring from being dislocated radially outwardly, it is not enough to overcome the kinds of forces described above in all applications, and it would be desirable to provide a guides means to prevent that dislocation.

In a less common configuration of accordion spring, the loops extend axially, while the pleats extend radially. Since the loops extend axially, the front dead loop cannot be easily stamped with a curvature that conforms to the roller on which it bears, but is flat, instead. In such a configuration, the pleats confront the side rails of the cage axially, and may rub thereon, but those side rails are often plastic, and are not as likely to wear the pleats as are the metal races. Of course, rubbing contact of the spring pleats with metal cages should be avoided. While it is the edges of the loops that radially confront the metal races, rather than the pleats, it is still desirable to prevent the loops from wearing on the races. And, given the flat front dead loop, there is actually less radial confinement provided to such a spring than with the other configuration, with its roller conforming front end. Furthermore, apart from the wear problem, it is desirable in general that any rubbing contact of the active spring loops with the races or cage, which could tend to interfere with the free flexing of the spring, be avoided. Such contact, even if deliberately provided, could prevent the spring from reacting quickly enough, or prevent it from flexing back and forth along the proper path. Any roller clutch energizing spring guide means that depended upon such deliberate contact would be undesirable for that reason alone. Likewise, any guide means that limited the potential size of the spring and the extent to which the spring could contract and expand, or which limited travel path of the roller, would be undesirable. Limiting the potential radial width of the spring could necessitate using a stiffer, and thus more highly stressed spring material in order to get enough energizing force.

The prior art includes patent disclosures that show various means for confining roller clutch energizing springs, but which say nothing about circumferential spring guidance as such. U.S. Pat. No. 4,368,809 to Husmann discloses an accordion spring of the second type discussed above, one that has radially extending pleats. Husmann provides a flange perpendicular to the front dead loop of the spring that rests against one axial end of the roller, and the spring is deliberately made significantly less wide pleat-to-pleat than the roller length. This serves to keep the pleats spaced away from the side rails of the cage, which is not particularly important unless the cage is metal, but does nothing to keep the spring from being thrown radially into the outer race. U.S. Pat. No. 3,087,588 to Fischer, assigned to the assignee of the present invention, discloses a roller clutch having a metal cage and accordion type energizing springs with pleats that extend axially, rather than radially. Side rails of the cage are interposed radially between the pleats of the spring and the outer race, as best seen in its FIG. 4. In an application subject to the kinds of displacing forces described above, these side rails would prevent the spring from being thrown radially outwardly into the outer race, as may be seen in its FIG. 5. However, that spring confinement would be gained only at the expense of wearing the pleats on the metal side rail, rather than on a metal race, which would be no gain at all. Even with a plastic cage, the clutch in Fischer would be undesirable because of the direct rubbing contact between an active loop of the spring and the cage.

Other references do specifically mention circumferential guidance for the energizing spring, but are still unsuitable. U.S. Pat. No. 4,415,072 to Shoji et al basically concerns a roller clutch in which the rollers are confined relative to the cage structure. However, in FIGS. 9 through 11, it does disclose a purported means for guiding the energizing spring. This means consists of a cross bar extending axially between the side rails of the metal cage. The cross bar is located circumferentially between the base of the energizing spring and the roller, and is located radially between the energizing spring and the outer clutch race. In one embodiment, a cap over the spring would rub back and forth on the underside of the cross bar to guide the spring as the spring expanded and contracted, thereby preventing the spring from being thrown radially into the outer race. In another embodiment, the spring would rub directly on the underside of the cross bar. Such a guide means is undesirable for essentially all the reasons discussed above. The cross bar, located as it is, presents a direct limit on the travel path of the roller. It also limits the potential radial thickness of the spring, and the spring cap would limit the extent of the spring's circumferential expansion and contraction. Without the spring cap, of course, the active loops of the spring would be subjected to deliberate and continual direct wear on the metal cross bar, perhaps several hundred cycles a second, which could be even more detrimental than non-deliberate and intermittent wear on the metal race.

Two foreign references, No. 1,213,177 and No. 1,254,916, (German A.S.) each disclose an apparent energizing spring guide means. Each deliberately does what a spring guide means should avoid, which is to let the spring rub on a metal race. The former shows the spring deliberately rubbing on the outer race, while the latter shows it deliberately rubbing on the inner race. In the '177 reference, the front loop 78 of an accordion spring with radially extending loops has a so called guide member portion 80 bent back integrally therefrom, extending like an umbrella over the outer pleats of the spring and closely confronting a cylindrical portion of the outer race. The guide member 80 is apparently supposed to slide like a shoe along the outer race surface, thereby providing circumferential guidance to the spring as it expands and contracts. Such an arrangement might have some validity if the guide shoe 80 stayed flat to the surface of the outer race on which it was supposed to slide. However, the Vs formed by the adjacent pairs of spring loops, including the front two loops, narrow and widen as the spring contracts and expands, and the guide member 80 would thus be continually changing its angle relative to the surface of the outer race. At the most compressed state of the spring, that angle could be such that the back end of the guide member 80 would jam into a cross bar 32 of the cage, seriously affecting clutch operation. The axially extending juncture between the guide member 80 and the front spring loop 78 from which it was bent would be subjected to continual wear against the outer race, and the guide member 80 would consequently be subject to eventually being disjoined entirely from the spring. Beyond these potential difficulties, the possible radial thickness of the spring would be inevitably limited, as radial room would be occupied by the guide member 80, and nothing at all would prevent the inner spring pleats from rubbing on the inner race. If anything, the guide member, resiliently bouncing of the outer race, would actually throw the inner pleats into the inner race. The '916 reference presents the converse structure. There, a guide member is bent from the front loop back under the lower spring pleats, intended to slide on the inner race. Such a structure would have the same drawbacks as the former structure, and it does nothing to prevent wear of the outer pleats on the outer race, which is the major problem, centrifugal force acting outwardly, not inwardly.

SUMMARY OF THE INVENTION

The invention provides an improved spring guide means that overcomes the shortcomings noted above, and which provides spring guidance without interference with the operation of the clutch. The invention is disclosed in two embodiments, each incorporated in an overrunning roller clutch of the type that has a molded cage adapted to be installed within the annular space between first and second substantially coaxial races. The roller clutches are to be used in environments that are subject to forces that tend to radially dislocate and wear unguided elements of the clutches against the first race, especially the springs. The cage is also the type that is molded by a single pair of axially parting mold elements so as to have a retention pocket with a side rail that has an axially inwardly facing stop surface and a pair of concentric cylindrical surfaces, with one cylindrical surface of each such pair being radially spaced from and confronting the second race. The clutch has a roller that moves circumferentially within each retention pocket and which axially engages the side rail stop surface as the clutch operates.

Each retention pocket also includes an energizing spring which urges the roller in a selected circumferential direction as the clutch operates. Each energizing spring is of the accordion type with a resilient active portion made up of a series of live spring loops and which urges the roller in a selected circumferential direction within the retention pocket. Each energizing spring also includes a guide portion, which consists of a double and a single tab on opposite sides of the front end of the spring, and which extend axially outwardly away from the active portion of the spring and beyond the side rail stop surfaces. The single-double guide tabs interfit with the double-single cage side rails respectively so as to be trapped radially between the side rail cylindrical surfaces and the second race. Therefore, the dislocating forces will slidably engage the trapped spring guide portions on the side rail cylindrical surfaces as the clutch operates. The tab-cylindrical surface provides circumferential guidance to the active portion of the energizing spring to thereby prevent it from wearing against the first race. Since the cage side rail-spring guide portion slidable engagement is axially remote from the active portion of the spring, it has no substantial effect of the operation of the energizing spring. And since the guide tabs and guide surfaces engage entirely outside the stop surfaces of the side rails, there is no limitation on the circumferential motion of the roller, or on the circumferential motion or size of the energizing spring.

It is, therefore, a general object of the invention to provide an improved guide means to prevent radial dislocation of an energizing spring in an overrunning clutch of the type that operates in the annular space between first and second substantially coaxial races and that has a cage adapted to be installed to one of the races within the annular space, and in which the cage includes a retention pocket having an axially inwardly facing stop surface that includes a circumferentially moving roller and energizing spring, and in which the roller axially engages with the stop surface as the clutch operates.

It is another object of the invention to provide such a guide means that acts without substantial affecting the operation of the energizing spring and without limiting the circumferential motion of the wedging element.

It is yet another object of the invention to provide such a guide means in an overrunning clutch of the type described that includes a circumferentially extending guide surface on the cage extending axially outwardly from the cage stop surface and axially outside of the retention pocket and also located radially spaced from and confronting the second race, and a guide portion on the energizing spring extending axially outwardly away from the active portion of the spring and beyond the retention pocket stop surface so as to be trapped radially between the cage guide surface and the second race, so that spring dislocating forces will slidably engage the trapped spring guide portion on the cage guide surface as the clutch operates and thereby circumferentially guide the active portion of the energizing spring to prevent it from wearing against the first race.

It is still another object of the invention to provide such a guide means by providing an energizing spring adapted to cooperate with the already existing cylindrical surfaces of a cage of the type that is molded by a single pair of axially parting mold elements.

DESCRIPTION OF THE PREFERRED EMBODIMENT

These and other objects and features of the invention will appear from the following written description and the drawings, in which.

Figure 1:
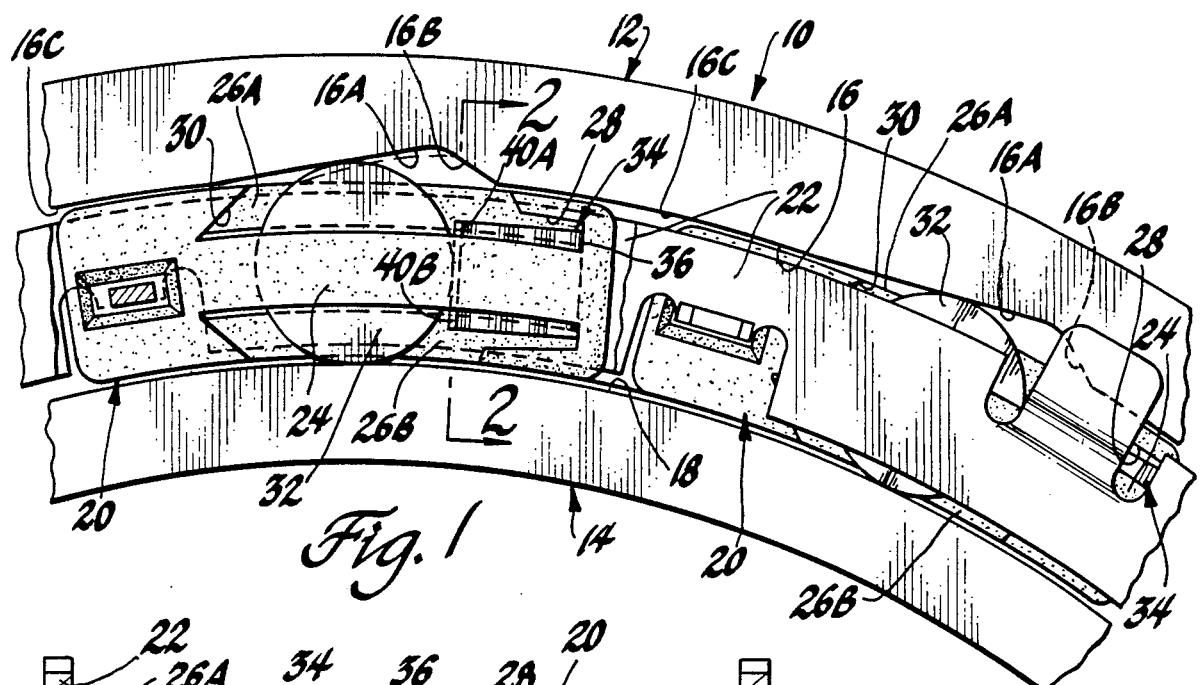
FIG. 1 shows a section of a first embodiment of a roller clutch embodying the invention, installed between a pair of clutch races that are illustrated in a nominally coaxial relation.

Referring first to FIG. 1, a first embodiment of an overrunning roller clutch incorporating the improved spring guide means of the invention is designated generally at 10. The roller clutch 10 operates between a pair of clutch races, an outer cam race designated generally at 12 and an inner race designated generally at 14. Cam race is so named because its inner surface 16 is comprised of a series of fourteen circumferentially spaced sloped cam ramps 16A each of which is integral with an oppositely sloped cam hook surface 16B, with each cam ramp 16A and cam hook 16B pair being circumferentially separated by an integral cylindrical portion 16C. The inner surface 18 of the inner race 14 is a cylindrical pathway, and is annularly spaced from the outer race surface 16. The clutch 10 maintains the races 12 and 14 substantially coaxial to one another, as will be described below. In conventional fashion, the clutch 10 allows the outer race 12 to overrun relative to the inner race 14 in the counterclockwise direction, but locks the outer race 12 to the inner race 14 should the outer race 12 attempt to rotate relative to the inner race 14 in the clockwise direction. Clutch 10 includes a cage structure that is adapted to be installed to the cam race 12, a cage structure comprised of a series of fourteen evenly spaced molded plastic journal blocks, designated generally at 20, sandwiched between a pair of axially spaced metal end rings 22, details of which will be described next.

Figure 2:
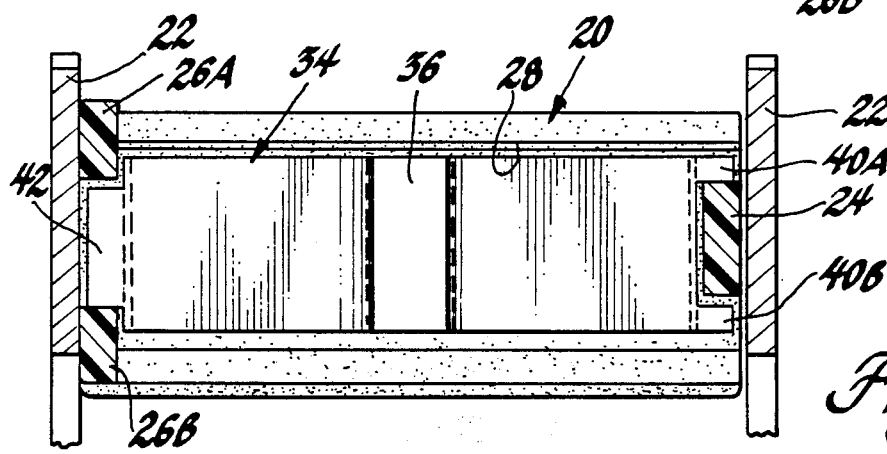
FIG. 2 is a sectional view of a first embodiment taken along the line 2—2 of FIG. 1, but with the clutch faces not illustrated.
Figure 3:
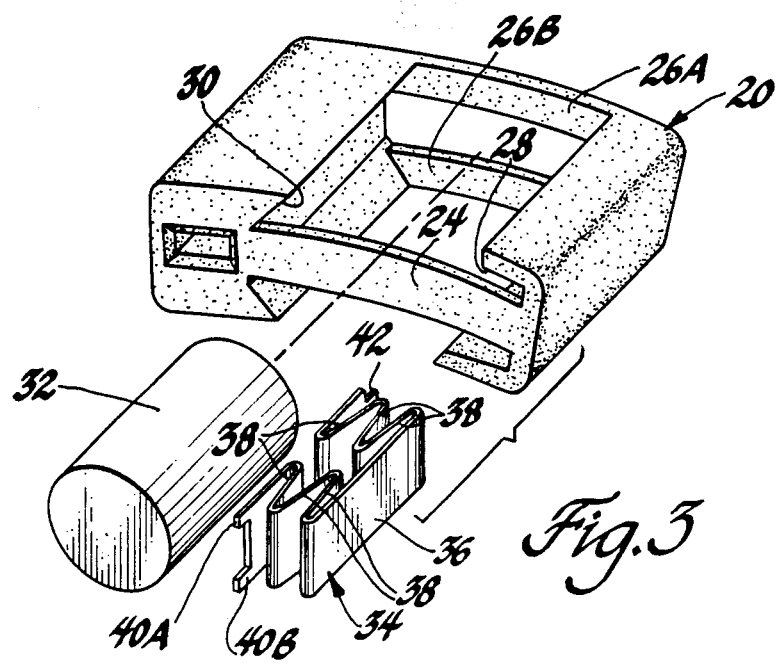
FIG. 3 is an exploded perspective view of a single journal block, roller and energizing spring of the first embodiment.

Referring next to FIGS. 1, 2 and 3, each journal block 20 is molded by a single pair of mold elements that part along a straight line that is generally parallel to the coaxis of the races 12 and 14. This is a simple and economical molding method, but it has certain consequences for the configuration of the journal block 20. Because of the molding method, each journal block 20 includes a single side rail 24 and an axially spaced double side rail 26A and 26B, all of generally annular shape and rectangular cross section, with the single side rail 24 located at a diameter intermediate the double side rail 26A and 26B, as best seen in FIG. 1. The inner surfaces of the side rails 24, 26A and 26B are generally planar and parallel, facing axially inwardly of the annular space toward one another. It would not be possible with a pair of axially parting mold elements to mold two axially spaced side rails that lay on the same diameter. Therefore, when the clutch 10 is in place, each side rail 24, 26A and 26B has a pair of concentric cylindrical surfaces that extend circumferentially within the annular space between the races 12 and 14. One cylindrical surface of each such pair faces radially inwardly, spaced from and confronting the pathway 18. These cylindrical surfaces, which exist essentially fortuitously, have not been utilized in the past, but selected ones of them are used to advantage is the invention as guide surfaces, as will appear. In addition, each journal block 20 is molded with a generally C-shaped slot 28 and a generally V-shaped slot 30.

Still referring to FIGS. 1, 2 and 3, the inner surfaces of the axially spaced side rails 24, 26A, 26B and the circumferentially facing slots 28 and 30 together define the confines of a box-like retention pocket for a cylindrical roller 32, which serves as a wedging element. Roller 32 has an axial length slightly less than the axial separation of the inner surfaces of the side rails 24, 26A and 26B, and fits therebetween with some clearance. The retention pocket so formed also contains an energizing spring, designated generally at 34, best seen in FIG. 3. Spring 34 is of the accordion type, and is formed from a single piece of spring steel stock with two generally parallel and axially spaced resilient branches extending integrally from opposite sides of a flat base 36 which has a width approximately equal to the axial separation of the inner surfaces of the side rails 24, 26A and 26B. Each resilient branch is comprised of three live loops 38, with adjacent live loop pairs integrally joined to one another by pleats to form a general V-shape, with two inboard pleats and two outboard pleats on each branch. When the spring 34 is in its free state as seen in FIG. 3, the outboard pleats of the loops 38 are spaced apart substantially the same as the axial separation of the inner surfaces of the side rails 24, 26A and 26B, while the inboard pleats of the loops 38 of each branch are axially spaced from one another. The front of each resilient spring branch is flat and is stamped with an axially outwardly extending double tab 40A and 40B on the left branch, and a single, wider axially outwardly extending tab 42 on the right branch. The tabs 40A, 40B, and 42 extend axially outwardly farther than the axial separation of the inner surfaces of the side rails 24, 26A and 26B, for a purpose discussed below. First, however, the installation and general operation of the clutch 10 will be more fully described, and then its assembly.

Referring next to FIG. 1, it may be seen that it is the radial thickness of the journal blocks 20, one of which fits between each inner race cylindrical portion 16C and the pathway 18, that keeps the races 12 and 14 annularly spaced and substantially coaxial. Each block 20 fits between the pathway 18 and a respective outer race surface cylindrical portion 16C. During assembly, the clutch 10 is first installed to the cam race 12, and then the inner race 14 is twisted clockwise inside of the rollers 32 and pushed axially inwardly, which is known generally as ringing in the inner race 14. To ease assembly, the journal blocks 20 are deliberately undersized relative to the nominal or ideal annular spacing between the races 12 and 14. As a consequence of this undersizing, the races 12 and 14 do not run absolutely coaxially, but with a deliberate running eccentricity, described next.

Figure 4:
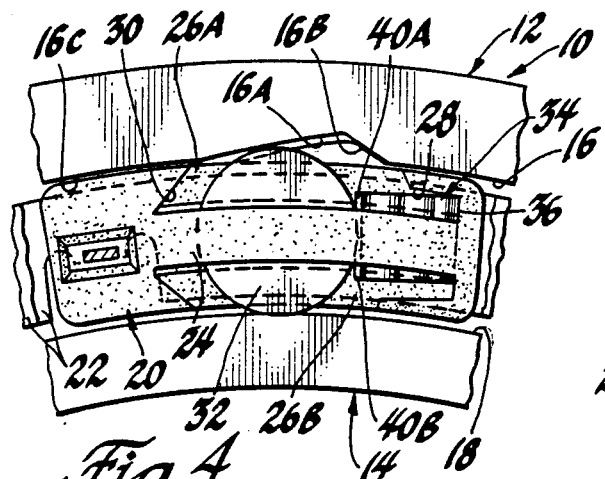
FIG. 4 is a view of a section of the first embodiment, but showing the clutch races at one extreme of their running eccentricity.
Figure 5:
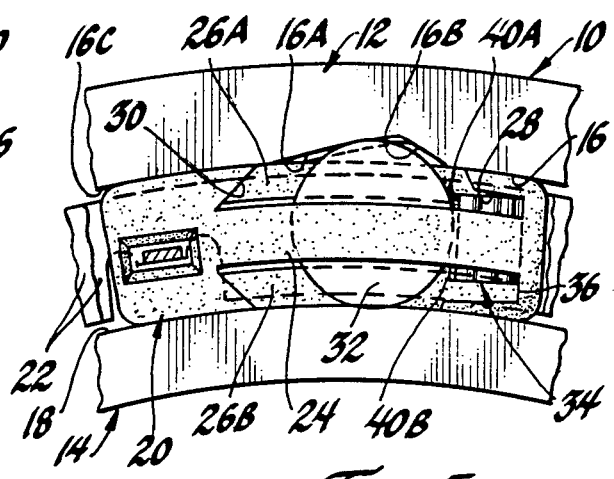
FIG. 5 is a view of the same structure as FIG. 4, but showing the other extreme.

Two extremes of the running eccentricity are illustrated in FIGS. 4 and 5. The running eccentricity has consequences for the operation of the rollers 32 and spring 34. The axial position of the roller 32 is determined by the inside surfaces of the side rails 24, 26A and 26B, which axially engage and serve as stop surfaces for the ends of the roller 32. The circumferential position of each roller 32 is determined by a three point contact between the pathway 18, a respective cam ramp 16A, and the end of a spring 34, which continually urges the roller 32 circumferentially to the left to maintain it in light touching engagement with cam ramp 16A and pathway 18. The positioning force of the pathway 18 and the cam ramp 16A, which are rapidly moving toward and away from one another, is far stronger than the force of the spring 34. Consequently, the roller 32 continually travels up and down its respective cam ramp 16A. The spring 34 continually travels with the roller 32, expanding and contracting with the same high frequency. As the spring 34 so expands and contracts, the Vs formed by the live loops 38 open and close, and the vast majority of spring flexing takes place at the pleats between the live loops 38. Thus, the live loops 38, which actively flex, may be termed the active portion of the spring. It may be seen that the travel of the roller 32 is entirely unimpeded, radially, axially or circumferentially, by any structure. All the annular space between the races 12 and 14 is available for the desired radial thickness of the spring 34. In the conventional case, that is, in the absence of the tabs 40A, 40B and 42, the spring likewise expands and contracts entirely without confinement or interference, contacting nothing except the roller 32, at least in the ideal case. However, the clutch 10 is intended for the transmission application discussed above, where unconfined parts of the clutch, notably the springs, are subject to dislocating forces such as oil throw and centrifugal force. Therefore, a guide means for the spring 34 is desirable, a guide means that would, ideally, provide circumferential guidance to the spring 34 without interference with the travel of either roller 32 or spring 34. Such is provided by the invention.

Referring next to to FIGS. 2 and 3, the clutch 10 is assembled as follows. The journal blocks 20 are first sandwiched between the end rings 22. Then, the rollers 32 and springs 34 are added, one of each in the retention pocket of each journal block 20. The particular spring 34, with its two axially spaced branches, is ideally suited for assembly to the particular journal block 20. The spring 34 is compressed, and its two branches are squeezed axially inwardly toward one another far enough that the tabs 40A, 40B and 42 will fit between the inner surfaces of the side rails 24, 26A and 26B respectively. The compressed spring 34 is then inserted within the confines of the retention pocket, along with a roller 32, which is held against the V-slot 30. Then, the spring 34 is released and allowed to expand. As the spring 34 expands, the spring base 36 seats itself between the side rails 24, 26A and 26B and within the C-slot 28, the front end of the spring 34 moves up into engagement with the roller 32, and the spring branches move back axially apart. As the spring branches spring axially back apart, they extend parallel to the side rails 24, 26A and 26B, and the outboard pleats of the live loops 38 may lightly touch the inner surfaces thereof, if desired. Simultaneously, the double tabs 40A and 40B move over the single side rail 24, while the single tab 42 moves between the double side rails 26A and 26B, with a slight radial clearance on both sides, as best seen in FIG. 2.

Referring next to FIGS. 1, 4 and 5, after the clutch 10 is installed, the interfitting of the tabs 40A, 40B and 42 and the side rails 24, 26A and 26B respectively leaves the tab 40B trapped radially between the radially inwardly facing cylindrical surface of the single side rail 24 and the cylindrical pathway 18, while the tab 42 is trapped radially between the radially facing cylindrical surfaces of the double side rails 26A and 26B. During operation of the clutch 10, the tabs 40A, 40B and 42 act as guide members for the spring 34, and cooperate with the side rails 24, 26A and 26B respectively. Any dislocating forces acting to dislocate the spring 34 radially outwardly as it travels between its FIG. 4 and FIG. 5 positions will not be able to throw any part or the spring 34 into the outer race 12. Instead, the dislocating forces will act to slidably engage the trapped tabs 40B and 42 with the radially inwardly facing cylindrical surfaces of the side rails 24 and 26A respectively, preventing such contact and wear. Of course, contact of spring 34 with the inner race 14 is similarly prevented by the radially outwardly facing cylindrical surfaces of the side rails 24 and 26B, although the dislocating forces generally act radially outwardly. Any contact between the outboard pleats of the loops 38 and the inner surfaces of the plastic side rails 24, 26A and 26B is not a significant wear problem.

Moreover, the slidable engagement of tabs and side rail cylindrical surfaces described above provides circumferential guidance to the spring 34 as it expands and contracts. As seen by comparing FIGS. 4 and 5 to FIG. 1, dislocating forces have acted to shift the spring 34 radially outwardly, but the front end of spring 34 has stayed on track, moving circumferentially back and forth along the circumferentially extending cylindrical guide surfaces of the side rails 24, 26A and 26B. Since the tabs 40A, 40B and 42 are axially remote from the live loops 38, the loops 38 are able to flex about the pleats with essentially no interference. The sliding contact between the edges of the tabs 40B, 42 and the side rails 24, 26A is virtually a line contact, and is substantially unaffected by the angle of those tabs relative to the respective side rails, and thus unaffected by the state of compression of the loops 38 or the angular position of the spring 34. Comparing FIG. 4 to FIG. 5, it will be seen how the tab 40B has substantially changed its angle relative to the side rail 24, but the contact between the tab 40B and the side rail 24 is substantially the same. In effect, the active portion and the guide portion of the spring 34 are mutually independent. The spring tabs 40A, 40B and 42 would be stamped so that the cut edges thereof which most often contacted the side rails 24, 26A and 26B would not be sharp edges. In addition, since the tabs 40A, 40B and 42 extend axially past the inner surfaces of the side rails 24, 26A, 26B and occupy none of the axial space of the retention pocket, the travel of the roller 32, is entirely and completely unaffected. Nor is the potential radial thickness or travel of the spring 34 in any way limited, as the guide means occupies none of the radial or circumferential space within the confines of the retention pocket. Thus, the guide means of the invention meets every criteria defined above for an ideal energizing spring guide means. What is more, providing as it does for cooperation between the already existing side rails 24, 26A, 26B and the tabs 40A, 40B and 42, the advantage of the invention is had at the cost only of the additional metal necessary to stamp the tabs 40A, 40B and 42, which is slight, especially for the particular spring 34.

Figure 6:
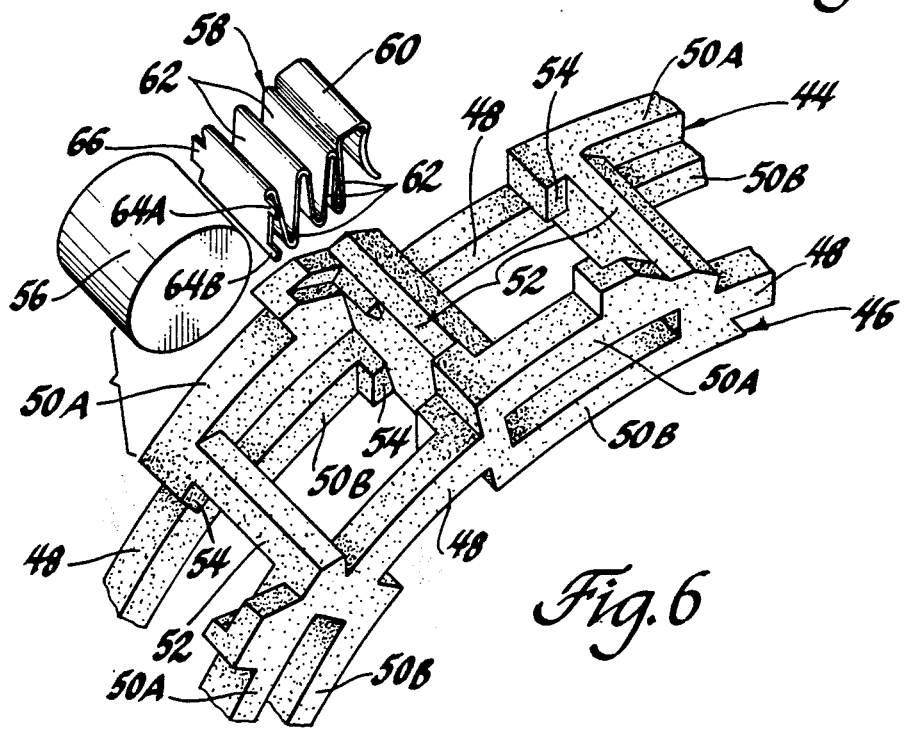
FIG. 6 is an exploded perspective view of a section of the cage and one roller and energizing spring of a second embodiment of a roller clutch embodying the invention.
Figure 7:
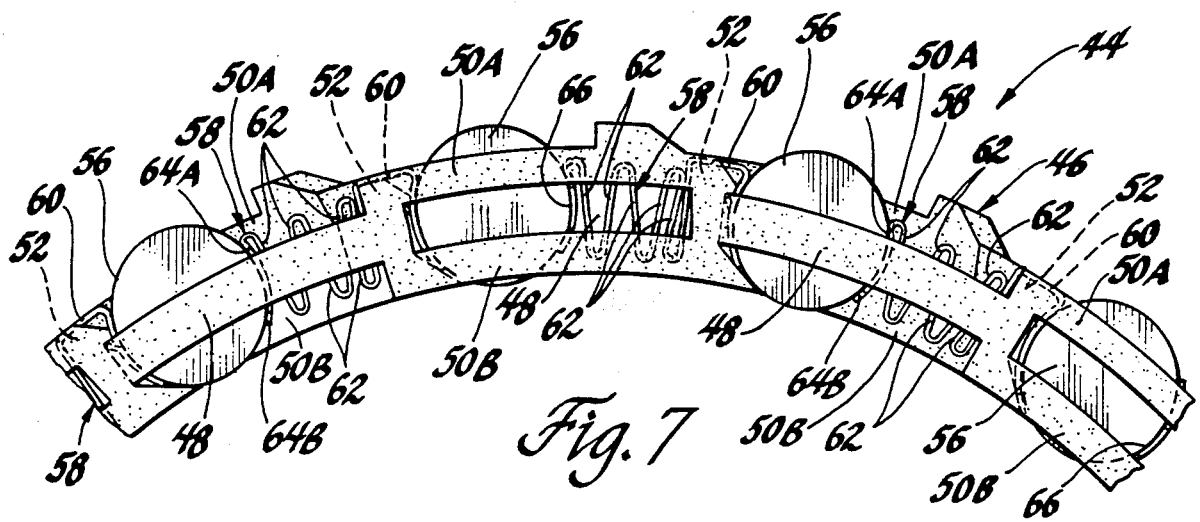
FIG. 7 is a side view of the second embodiment.

Referring next to FIGS. 6 and 7, a second embodiment of a clutch incorporating the improved spring guide means of the invention is designated generally at 44. The clutch 44 may be much more briefly described, as its operation is very similar to the first embodiment 10. Clutch 44 would be used between a pair of clutch races like that in the first embodiment 10, not illustrated, and in a similar environment. The clutch 44 includes a molded plastic cage designated generally at 46 which is molded by the same method as the journal block 20 of the first clutch 10, but which is unitary, and has no metal end rings. A similar cage is disclosed in U.S. Pat. No. 3,917,036, assigned to the assignee of the present invention. Molded as it is, the cage 44 includes a series of evenly circumferentially spaced retention pockets, each formed by axially spaced single and double side rails 48, 50A and 50B respectively, and integral cross bars 52, each having a central groove 54. The planar and parallel inner surfaces of the side rails 48, 50A and 50B face axially inwardly toward one another, and are axially spaced slightly greater than the length of a cylindrical roller 56 that fits therebetween, providing stop surfaces therefor. Because of the molding method, each side rail 48, 50A and 50B includes a pair of concentric cylindrical surfaces, one facing radially outwardly, and one radially inwardly. These surfaces are used to advantage, as with the first embodiment 10.

Referring next to FIG. 6, each retention pocket also contains an energizing spring, only one of which is shown and designated generally at 58. Each energizing spring 58 includes a base 60 that is bent into a U-shape and which snap fits into a cross bar groove 54 to mount the spring 58 to the cage 44. Spring 58 is also of the accordion type, with a resilient active portion comprised of five radially extending live loops 62 with adjacent live loop pairs integrally joined to one another by axially extending pleats to form a general V-shape. The axial width of spring 58 is such that the edges of the live loops 62 rest closely adjacent to the inner surfaces of the side rails 48, 50A and 50B when the spring 58 is mounted to the cage 44. The front end of the spring 58 is a dead loop that is bent so as to conform to a respective roller 56, which it urges continually to the left. The travel of roller 56 and spring 58 during the operation of clutch 44 has the same high frequency as with the first embodiment 10, and the roller 56 similarly axially bumps and is confined by the inner stop surfaces of the side rails 48, 50A and 50B as it travels. With a configuration like that of spring 58, however, the outer three pleats are particularly vulnerable when used in an environment subject to dislocating forces, because they would directly confront the outer race. A similar guide means is provided to prevent such contact.

Referring next to FIGS. 6 and 7, the front dead loop of spring 58 is stamped with an axially outwardly extending double tab 64A and 64B on one side and a single, wider axially outwardly extending tab 66 on the other side. As with the first embodiment 10, the tabs 64A, 64B and 66 extend axially outwardly farther than the axial separation of the axially confronting inner surfaces of the side rails 48, 50A and 50B. Also, as with the first embodiment 10, the tabs 64A, 64B and 66 interfit with the side rails 48, 50A and 50B respectively, with a slight mutual radial clearance. Being a single branched accordion spring, however, spring 58 would have to be mounted differently than spring 34. This could be done by compressing the spring 58, turning it ninety degrees from its FIG. 6 orientation, locating it in the retention pocket, turning it back to its FIG. 6 orientation, and releasing it to expand until it engaged the roller 56. Then, the base 60 would be pulled up and out of the pocket in a separate step and snapped into the cross bar groove 54. Once clutch 44 has been assembled and installed, the tab 64B is trapped radially between the radially inwardly facing cylindrical surface of side rail 48 and the inner race (not shown), while the tab 66 is trapped radially between the side rails 50A and 50B. It may be readily understood that the same guidance and protection is thus provided to the spring 58 as to the spring 34 during operation of the spring 58. The particularly vulnerable radially outer pleats of the spring 58 are kept away from the outer race. There is no limitation on the travel of roller 56, because the cylindrical guide surfaces of the side rails 48, 50A and 50B are axially remote from the inner stop surfaces thereof, occupying no axial space within the retention pocket. Likewise, there is no limitation of the travel of the spring 58, since the guide portions of the spring 58, that is, the tabs 64A, 64B and 66, are axially remote from the active loops 62. As with the first clutch 10, the guide means occupies no circumferential, axial or radial space within the confines of the retention pocket.

Variations of the embodiments disclosed may be made within the spirit of the invention. Both embodiments basically take advantage of existing cage structure that was previously unused, that is, the radially facing cylindrical surfaces left by the molding process. However, it would be possible to mold cages or journal blocks by the same molding process in which the side rails were not annular segments, but straight segments instead, creating an essentially polygonal shape. This would provide guide surfaces on the cage that still extended circumferentially within the annular space between the races and which were radially spaced from the surfaces of inner race and outer race. However, the guide surfaces would now be straight and flat, rather than cylindrical and curved, and could thus be tailored so as to guide the spring circumferentially along any path of travel desired. Likewise, while cages molded like those disclosed are a very convenient way to provide the circumferentially extending, radially spaced cage guide surfaces, those guide surfaces could be provided otherwise, as on separate guide members of the cage. So, to, with the spring guide portions. The edges of the guide tabs could be bent over to an extent, in order to give more surface area thereof in contact with the guide surfaces of the cage. While the integrally stamped guide tabs are convenient, the guide members could be provided by some other structure separately attached to the spring, or even located on the side, rather than on the front of the spring. So long as the guide surfaces and guide portions were relatively oriented and located as described, the advantages of the invention would be had.

The embodiments of the invention in which an exclusive property or privilege is claimed are defined as follows:

1. In an overrunning clutch of the type that operates in the annular space between first and second substantially coaxial races and that has a cage installable to one of said races within said annular space, said cage including a retention pocket having an axially inwardly facing stop surface, said clutch further having a wedging element that moves circumferentially within said retention pocket and which axially engages with said stop surface as said clutch operates, and an energizing spring mounted to said cage with a resilient active portion located within said retention pocket that urges said wedging element in a selected circumferential direction and which moves circumferentially with said wedging element as said clutch operates, said spring also being subjected to forces that tend to radially dislocate said spring as said clutch operates and wear said spring against said first race, an improved guide means to prevent said spring dislocation, comprising, a circumferentially extending guide surface on said cage extending axially outwardly from said cage stop surface and axially outside of said retention pocket and also located radially spaced from and confronting said second race, and, a guide portion on said energizing spring extending axially outwardly away from the active portion of said spring and beyond said retention pocket stop surface so as to be trapped radially between said cage guide surface and said second race, whereby said dislocating forces will slidably engage said trapped spring guide portion on said cage guide surface as said clutch operates and thereby circumferentially guide said energizing spring to prevent it from wearing against said first race, said cage guide surface-spring guide portion slidable engagement, by virtue of being axially remote from both the active portion of said spring and from said cage stop surface, providing said circumferential guidance without substantial effect on the operation of said energizing spring and without limiting the circumferential motion of said wedging element.

2. In an overrunning clutch of the type that has a molded cage installable within the annular space between first and second substantially coaxial races and which is subject to forces that tend to radially dislocate and wear unguided elements of said clutch against said first race, said cage further being of the type that is molded by a single pair of axially parting mold elements so as to have a retention pocket with a side rail that has an axially inwardly facing stop surface and a pair of concentric cylindrical surfaces, with one cylindrical surface of said pair being radially spaced from and confronting said second race, said clutch further having a roller that moves circumferentially within said retention pocket and which axially engages said side rail stop surface as said clutch operates, an improved roller energizing spring which cooperates with said cage to prevent radial dislocation of said spring, said improved spring comprising, a mounting portion for attaching said spring to said cage, a resilient active portion which urges said roller in a selected circumferential direction within said retention pocket, and, a guide portion on said energizing spring extending axially outwardly away from the active portion of said spring and beyond said side rail stop surface so as to be trapped radially between said one side rail cylindrical surface and said second race, whereby said dislocating forces will slidably engage said trapped spring guide portion on said one side rail cylindrical surface as said clutch operates and thereby circumferentially guide said energizing spring to prevent it from wearing against said first race, said cage side rail-spring guide portion slidable engagement, by virtue of being axially remote from both the active portion of said spring and from said side rail stop surface, providing said circumferential guidance without substantial effect on the operation of said energizing spring and without limiting the circumferential motion of said roller.

3. An overrunning clutch of the type that operates between first and second substantially coaxial and annularly spaced races and which is subject to forces that tend to radially dislocate and wear unguided elements of said clutch against said first race, comprising, a cage installable within the annular space between said races, said cage further being of the type that is molded by a single pair of axially parting mold elements so as to have a retention pocket formed by first and second side parallel side rails having axially spaced and axially inwardly facing stop surfaces and a pair of concentric cylindrical surfaces, with one of said cylindrical surfaces of each pair being radially spaced from and confronting said second race, a cylindrical roller of a length slightly less than the axial spacing of said side rail stop surfaces so that said roller may move circumferentially within said retention pocket with the ends of said roller axially engaging said side rail stop surfaces as said clutch operates, an energizing spring including a base adapted to fit between said first and second side rails and first and second substantially parallel resilient branches spaced from one another by substantially the axial spacing of said side rail stop surfaces, with each said spring branch also having a guide tab extending axially outwardly and away from said branches beyond said side rail stop surfaces, whereby, said spring base may be attached to said cage by locating said spring base within said retention pocket and squeezing said first and second branches together sufficiently that said guide tabs will fit within said side rail stop surfaces and then releasing said spring branches so that said first and second branches extend parallel along said first and second side rails respectively with the end of each branch bearing on said roller to urge it in a selected circumferential direction within said pocket and with each guide tab trapped radially between a respective side rail cylindrical surface and said second race, whereby said dislocating forces will slidably engage said trapped guide tabs on said side rail cylindrical surfaces as said clutch operates and thereby circumferentially guide said spring branches to prevent them from wearing against said first race, said side rail-spring guide tab slidable engagement, by virtue of being axially remote from both the spring branches and from said side rail stop surfaces, providing said circumferential guidance without substantial effect on the operation of said energizing spring and without limiting the circumferential motion of said roller.

* * * * *